US011957265B2

(12) United States Patent
Moon et al.

(10) Patent No.: US 11,957,265 B2
(45) Date of Patent: Apr. 16, 2024

(54) SMART KETTLE USING INDUCTION HEATING (71) Applicant: LG Electronics Inc., Seoul (KR)

(72) Inventors: Hyunwook Moon, Seoul (KR); Yangkyeong Kim, Seoul (KR); Wan Soo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1206 days.

(21) Appl. No.: 16/609,117

(22) PCT Filed: Aug. 23, 2017

(86) PCT No.: PCT/KR2017/009198
§ 371 (c)(1),
(2) Date: Oct. 28, 2019

(87) PCT Pub. No.: WO2018/199399
PCT Pub. Date: Nov. 1, 2018

(65) Prior Publication Data
US 2021/0100391 A1 Apr. 8, 2021

(30) Foreign Application Priority Data
Apr. 26, 2017 (KR) .......................... 10-2017-0053988

(51) Int. Cl.
H05B 6/06 (2006.01)
A47B 33/00 (2006.01)
(Continued)

(52) U.S. Cl.
CPC ........... *A47J 27/2105* (2013.01); *A47B 33/00* (2013.01); *A47J 36/32* (2013.01); *H02J 50/12* (2016.02);
(Continued)

(58) Field of Classification Search
CPC ...... A47B 2200/008; A47B 2220/0097; A47B 33/00; A47J 2202/00; A47J 27/088;
(Continued)

(56) References Cited

U.S. PATENT DOCUMENTS 3,742,178 A 6/1973 Harnden, Jr.
7,875,836 B2 * 1/2011 Imura .................. A47J 45/068
219/620
(Continued)

FOREIGN PATENT DOCUMENTS

CN 105877460 A * 8/2016
CN 205458027 U * 8/2016
(Continued)

OTHER PUBLICATIONS

Extended European Search Report in European Appln. No. 17907367.1, dated Aug. 14, 2020, 10 pages.

*Primary Examiner* — Quang T Van
(74) *Attorney, Agent, or Firm* — Fish & Richardson P.C.

(57) ABSTRACT

A smart kettle is disclosed. The smart kettle includes a body that is configured to increase in temperature in response to a magnetic field. The smart kettle further includes a temperature sensor that is located on a bottom of the body and that is configured to measure a temperature of the bottom of the body. The smart kettle further includes a controller that is configured to adjust a strength of the magnetic field based on the temperature measured by the temperature sensor by outputting a control signal.

18 Claims, 10 Drawing Sheets (51) Int. Cl.
  *A47J 27/21*  (2006.01)
  *A47J 36/32*  (2006.01)
  *H02J 50/12*  (2016.01)
  *H05B 6/10*  (2006.01)
  *H05B 6/12*  (2006.01)

(52) U.S. Cl.
  CPC ............... *H05B 6/06* (2013.01); *H05B 6/108* (2013.01); *H05B 6/1236* (2013.01); *H05B 6/1245* (2013.01); *A47B 2200/008* (2013.01); *A47B 2220/0097* (2013.01); *A47J 2202/00* (2013.01); *H05B 2213/06* (2013.01)

(58) Field of Classification Search
  CPC ........ A47J 27/21; A47J 27/2105; A47J 36/02; A47J 36/32; A47J 27/21158; H02J 50/12; H05B 1/02; H05B 2213/06; H05B 6/06; H05B 6/108; H05B 6/1236; H05B 6/1245; H05B 6/36; H05B 1/0202; H05B 6/365; A63B 2243/0054; A63B 37/0002; A63B 69/0046; A63B 71/148

USPC ....... 219/628, 620, 621, 624, 625, 626, 627, 219/630, 635, 650, 663, 667, 675
  See application file for complete search history.

(56) References Cited

U.S. PATENT DOCUMENTS

| | | | |
|---|---|---|---|
| 2012/0000903 A1* | 1/2012 | Baarman | H05B 6/1236 |
| | | | 219/620 |
| 2015/0163864 A1 | 6/2015 | Baarman et al. | |
| 2015/0313406 A1 | 11/2015 | Park | |
| 2017/0013681 A1 | 1/2017 | Lee et al. | |

FOREIGN PATENT DOCUMENTS

| | | |
|---|---|---|
| EP | 1037508 | 9/2000 |
| GB | 2445780 | 7/2008 |
| JP | 2008132108 | 6/2008 |
| KR | 20090040702 | 4/2009 |
| KR | 20090104965 | 10/2009 |
| KR | 20110104987 | 9/2011 |
| KR | 20140109921 | 9/2014 |
| WO | WO2017052282 | 3/2017 |

* cited by examiner

SMART KETTLE USING INDUCTION HEATING

CROSS-REFERENCE TO RELATED APPLICATIONS

This application is a National Stage application under 35 U.S.C. § 371 of International Application No. PCT/KR2017/009198, filed on Aug. 23, 2017, which claims the benefit of Korean Patent Application No. 10-2017-0053988, filed on Apr. 26, 2017. The contents of both are incorporated by reference.

TECHNICAL FIELD

This specification relates to a smart kettle using induction heating, and more specifically, to a smart kettle that may be used in a smart table generating magnetic fields and heats contents by the magnetic fields applied from the smart table.

BACKGROUND

Typically, tables are used to have things or foods placed on and support the things and foods in homes, restaurants, or offices.

Recently, more attempts are being made to use tables for a diversity of purposes by having various devices or modules, but not simply for supporting things.

SUMMARY

Research is under way for smart tables with a built-in induction heating module that heats metal cooking vessels by electric induction heating.

A smart kettle compatible with a smart table is an electric cooker that lets a high-frequency current flow through a working coil or heating coil to generate magnetic field lines and heats the vessel by eddy currents created by the magnetic field lines.

The basic mechanism of the smart kettle is as follows: As electric current is applied to the heating coil, the vessel, a magnetic body, generates heat by induction heating which then heats up the vessel to cook the food.

In other words, the smart kettle may heat the contents in the vessel based on induction heating. A type of conventional smart kettles have a vessel and a metallic material which is detachably coupled with the vessel inside the vessel and may be heated by a magnetic field. The metallic material is sized to be smaller than the bottom of the vessel to be attached to or detached from the vessel. Such structural limit renders it difficult to implement a high power output.

Another type of conventional smart kettles have a temperature sensor projecting internally from the vessel to measure the temperature inside the vessel, and such temperature sensor may hinder washing up the vessel and be broken during the wash. Also water leaks may occur in the connecting part between the temperature sensor and the vessel.

An object of the subject matter described in this specification is to provide a smart kettle that includes an induction heating (IH)-enabled magnetic body in the bottom of the body on which the contents is placed and may adjust the magnitude of a magnetic field applied to the body depending on the temperature of the body.

Another object of the subject matter described in this specification is to provide a smart kettle in which a temperature sensor for measuring the temperature of the body is attached to a bottom surface opposite to the space containing the contents in the body to reduce the likelihood that the temperature sensor is broken when cleaned, and there is no connecting part for coupling with the temperature sensor to remove the likelihood of water leaks that would otherwise occur in a connecting part, and that may address issues (e.g., electricity leakage or electric shocks) that may arise when the vessel is washed.

Still another object of the subject matter described in this specification is to provide a smart kettle that includes an IH heating-enabled magnetic body in the bottom of the body and a vacuum space formed in the side to prevent heat loss to thereby enhance warm-keeping functionality.

According to an innovative aspect of the subject matter described in this specification, a smart kettle includes a body that is configured to increase in temperature in response to a magnetic field; a temperature sensor that is located on a bottom of the body and that is configured to measure a temperature of the bottom of the body; and a controller that is configured to adjust a strength of the magnetic field based on the temperature measured by the temperature sensor by outputting a control signal.

This implementation and other implementations may include one or more of the following optional features. The smart kettle includes a power receiving coil that is located on the bottom of the body and that is configured to generate alternating current (AC) power in response to the magnetic field; a rectifier that is configured to convert the AC power received from the power receiving coil into direct current (DC) power; and a power unit that is configured to provide the DC power received from the rectifier to the controller. The smart kettle includes a support that includes the power receiving coil and the temperature sensor and that is coupled to the bottom of the body. The power receiving coil is located on a bottom of the support. The temperature sensor is located in a center of the support and is configured to measure the temperature of the bottom of the body by contacting an outside of the bottom of the body. The smart kettle includes a communication unit that is configured to transmit the control signal to a smart table that is configured to generate the magnetic field.

The smart kettle includes an interface unit that is configured to determine a target temperature based on receiving an input from a user; and a display unit that is configured to display the target temperature on a screen using a color or a number. The controller is configured to adjust the temperature measured by the temperature sensor to the target temperature by adjusting, using the control signal, the magnetic field generated by the smart table. The smart kettle includes a magnetic body that is integrated with an inner surface and that is configured to increase in temperature in response to the magnetic field; and non-magnetic body that is located on a portion of a bottom of the outer surface of the body and that is configured to not respond to the magnetic field. The body includes a vacuum space that is located between the inner surface and the outer surface.

According to another innovative aspect of the subject matter described in this specification, a smart kettle used over a smart table that generates a magnetic field includes a body that is configured to increase in temperature in response to the magnetic field generated by the smart table; and a controller that is configured to adjust a strength of the magnetic field based on the temperature of the body by outputting a control signal.

This implementation and other implementations may each include one or more of the following optional features. The smart kettle includes a first portion that defines a bottom of the body; and a second portion that defines a side wall of the body that is connected with the bottom of the body and that that defines a vacuum space inside the second portion. The first portion includes a magnetic body that is located in a center of the first portion and that is configured to increase in temperature in response to the magnetic field; and a non-magnetic body that contacts the magnetic body at an outside of the first portion and that is configured to not respond to the magnetic field. The first portion includes a magnetic body that defines an inner surface and an outer surface of the bottom of the body and that is configured to increase in temperature in response to the magnetic field. The first portion includes a non-magnetic body that defines an inner surface of the bottom of the body and that is configured to not respond to the magnetic field and a magnetic body that defines an outer surface of the bottom of the body and that is configured to increase in temperature in response to the magnetic field.

The first portion includes a non-magnetic body that defines an inner surface and an outer surface of the bottom of the body and that is configured to not respond to the magnetic field and a magnetic body that is located inside the non-magnetic body and that is configured to increase in temperature in response to the magnetic field. The first portion and the second portion (i) include a magnetic body that is configured to increase in temperature in response to the magnetic field and (ii) are integrally formed with each other. The first portion does not define the vacuum space. The smart kettle includes a temperature sensor that is located on a bottom of the body and that is configured to measure a temperature of the bottom of the body; a power receiving coil that is located on the bottom of the body and that is configured to generate electricity in response to the magnetic field; a power unit that is configured to provide electricity received from the power receiving coil to the controller; and a communication unit that is configured to wirelessly transmit the control signal to the smart table.

The temperature sensor is located in a center of an outside of the bottom of the body and is configured to measure the temperature of the body. The controller is configured to adjust, by generating the control signal, the strength of the magnetic field generated by the smart table based on the temperature measured by the temperature sensor. The smart kettle includes an interface unit that is configured to determine a target temperature based on receiving an input from a user; and a display unit displaying the target temperature on a screen using a color or a number. The controller is configured to adjust the temperature measured by the temperature sensor to the target temperature by adjusting, using the control signal, the magnetic field generated by the smart table.

DETAILED DESCRIPTION

Figure 1:
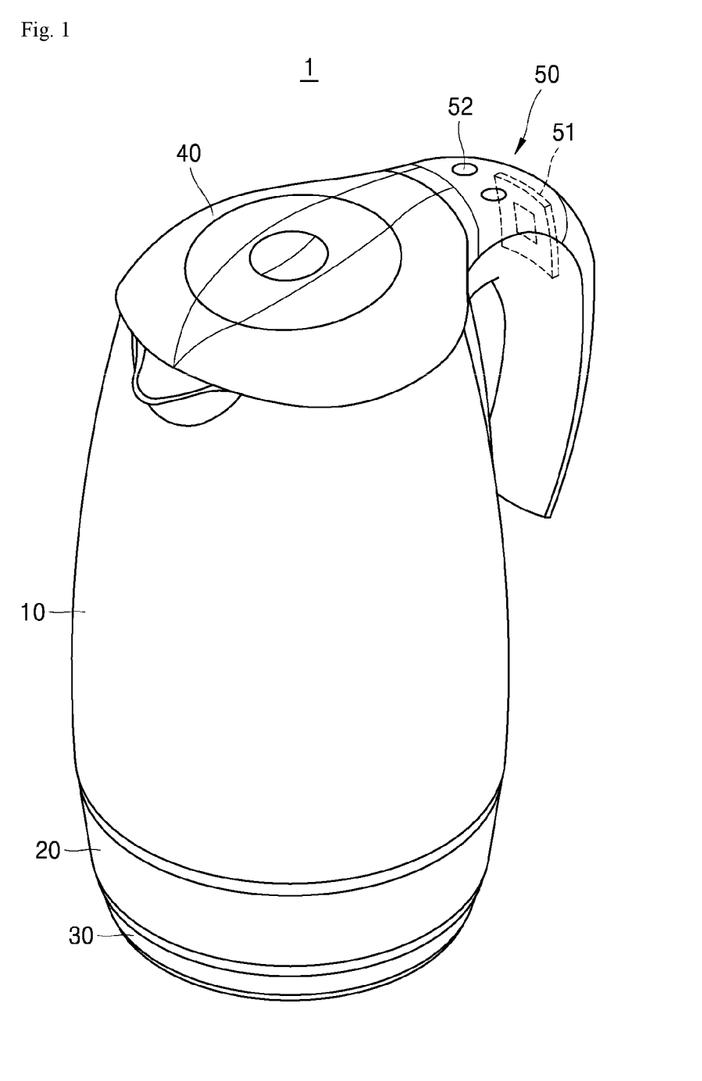
FIGS. 1 and 2 are perspective views of an example smart kettle.
Figure 2:
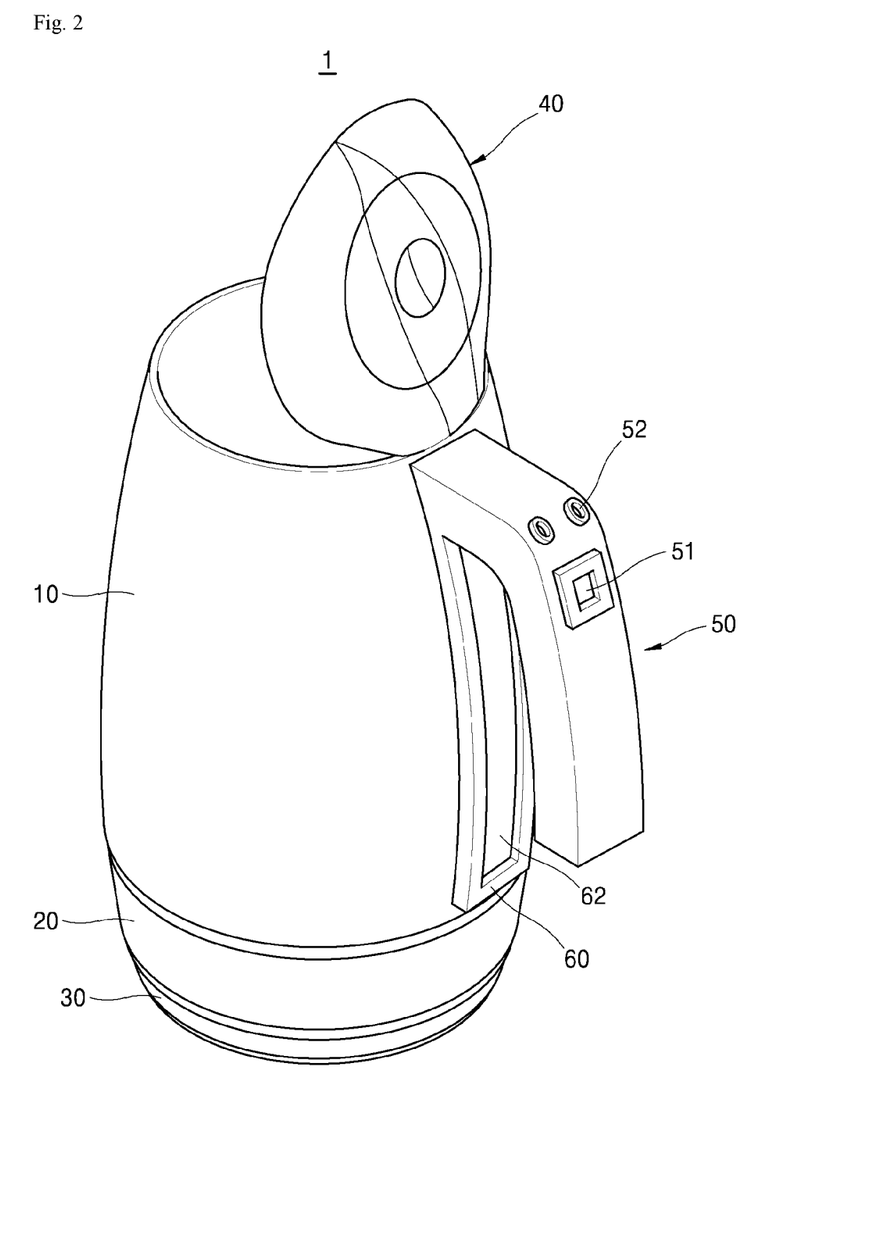

FIGS. 1 and 2 are perspective views illustrating an example smart kettle.

Referring to FIGS. 1 and 2, a smart kettle 1 includes a body 10, a support 20, a base 30, a cover 40, and a handle 50.

The body 10 may contain contents inside and have an outlet formed in one side to communicate with the inside to discharge the contents to the outside. The body 10 has a top opening and the cover 40 may be coupled to the open top. The body 10 includes a vacuum space that prevents heat leakage from the contents inside the body 10 to the outside to thereby maintain the temperature of the contents for a long term.

The outer surface of the body 10 may be formed in a cylindrical, curved, streamlined shape, or any other similar shape.

The support 20 is coupled to the bottom of the body 10 to support the body 10. The support 20 may be formed to couple to the outer surface of the body 10.

The base 30 is formed on the bottom of the support 20 to firmly hold the support 20 to prevent the support 20 from easily sliding off or to lower the center of gravity. For example, the base 30 may be formed of an elastic material. In some implementations, the base 30 may be omitted.

The cover 40 may be hinged to a side of the body 10 and cover the open top of the body 10. The cover 40 may be coupled to the body 10 to allow the contents in the body 10 to be discharged only through the outlet.

The handle 50 may be formed on the opposite side of the body 10 in such a shape that the user easily grips in his hand. The handle 50 may include an interface unit 51 for receiving control inputs from the user and a display unit 52 for displaying the temperature of the body 10.

The interface unit 51 may receive an input for setting a target temperature by adjusting the temperature of the body 10 or an input regarding whether the smart kettle 1 operates from the user.

The display unit 52 may display the target temperature or information about whether it operates received from the interface unit 51 on the screen using a color or number. For example, the display unit 52 may include an LED for displaying the temperature in color or an LCD panel for displaying the temperature information in number.

The interface unit 51 and the display unit 52 shown in the drawings are merely an example. The interface unit 51 and the display unit 52 may be arranged in different positions and other shapes in the smart kettle 1.

A water level display unit 60 may be formed on one side of the body 10 to show the user the water level of the contents in the body 10. The water level display unit 60 may display the water level of the contents in the body 10 through a transparent glass 62. In some implementations, the water level display unit 60 may measure the water level of the contents in the body 10 using a water level sensor installed inside the body 10 and display the water level on the display unit 52.

Figure 3:
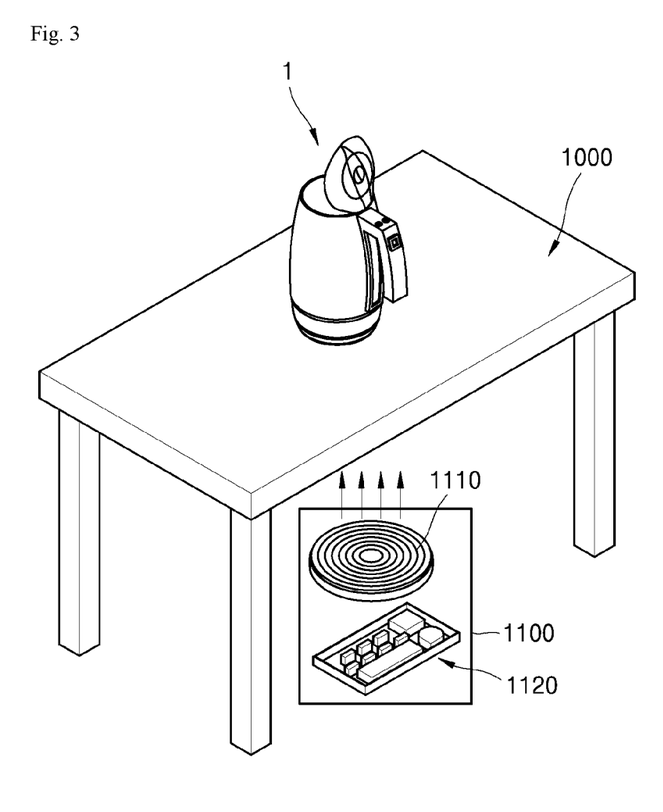
FIG. 3 illustrates an example smart table applying a magnetic field to an example smart kettle.

FIG. 3 is a view illustrating an example smart table applying a magnetic field to the example smart kettle of FIG. 1.

Referring to FIG. 3, the smart table 1000 heating the smart kettle 1 may have the functions of wireless power transmission and induction heating.

As shown in FIG. 3, the smart table 1000 may induction-heat the smart kettle 1 placed on the plate.

Where an AC current, particularly a high-frequency AC current, flows through the working coil, with the smart kettle 1 sitting on the working coil of the smart table 1000, a magnetic field is generated around the working coil. By the electromagnetic induction effect of the magnetic field, eddy currents are induced through the cooking vessel. The eddy currents generate Joule's heating through the resistance element of the cooking vessel, heating the cooking vessel.

The smart table 1000 may also supply wireless power to a wireless home appliance (e.g., the smart kettle 1) capable of receiving wireless power. In other words, the smart table 1000 and wireless home appliances may transmit/receive wireless power via a known wireless power transmission system, e.g., an electromagnetic induction scheme and a magnetic resonance scheme.

The electromagnetic induction scheme is based on the electromagnetic induction phenomenon that when a magnetic field is varied around a conductor through which current flows, thereby causing a current to flow.

The magnetic resonance scheme may transmit power by wireless power transfer meaning that an electromagnetic wave moves from a transmitter to a receiver when the transmitter and the receiver resonate at the same frequency. The transmitting coil of the transmitter may have a predetermined resonance frequency and receive energy from a power unit to generate an electromagnetic wave, thereby generating a magnetic field. At this time, the receiving coil of the receiver may generate induction power by the magnetic field.

The smart table 1000 may include a wireless power transmission module 1100 inside or on the bottom of the plate. The wireless power transmission module 1100 includes a wireless power transmitting coil (Tx coil) 1110 and an inverter 1120 for supplying power to the wireless power transmitting coil 1110.

The wireless home appliance may have a wireless power receiving unit to receive wireless power from the wireless power transmitting coil 1110 through the wireless power receiving coil (e.g., the power receiving coil 210 of FIG. 5) of the wireless power receiving unit.

In some implementations, the wireless power transmission module 1100 may perform the function of induction-heating an induction heating cooker upon cooking. In this case, the wireless power transmitting coil 1110 may be operated as a working coil that generates a magnetic field for induction-heating a nearby object.

In some implementations, the smart table 1000 may wirelessly communicate with a home appliance, e.g., a cooker, and interact with other devices.

Figure 4:
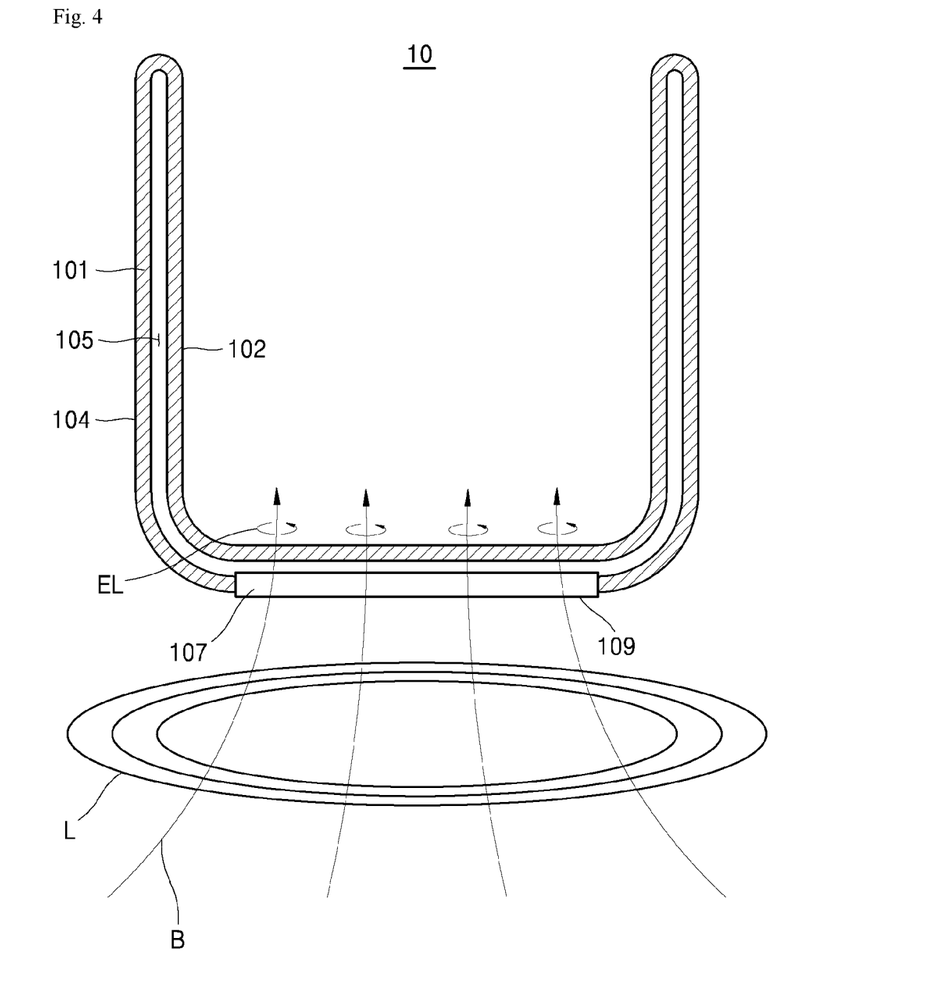
FIG. 4 illustrates the principle of heating an example smart kettle.
Figure 5:
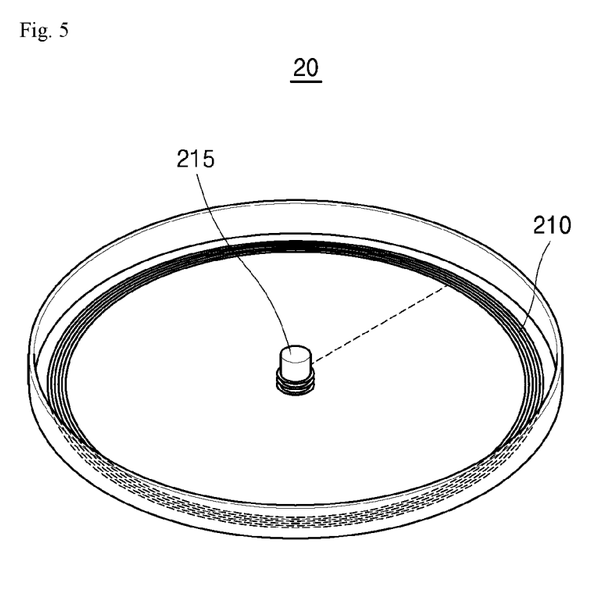
FIG. 5 illustrates a support of an example smart kettle.

FIG. 4 is a view illustrating the principle of heating the example smart kettle of FIG. 3. FIG. 5 is a view illustrating an example support of the example smart kettle of FIG. 1.

Referring to FIG. 4, in the smart table 1000 heating the smart kettle 1, if current is supplied to a heating coil L included in the smart table 1000, a magnetic field B is induced through the inside of the heating coil L. In particular, if a current varying over time, e.g., AC current, is supplied to the heating coil L, a magnetic field B varying over time is induced inside the heating coil L. As such, the magnetic field B generated by the heating coil L passes through the bottom of the body 10.

If the magnetic field B varying over time passes through the conductor, a current spinning around the magnetic field B is generated in the conductor. As such, the phenomenon that a current is induced by the magnetic field B varying over time is called electromagnetic induction, and the spinning current is called an eddy current. In the case of a cooker using induction heating, electromagnetic induction and eddy current are generated at the bottom of the body 10.

If the magnetic field B generated by the heating coil L passes through the bottom of the body 10, an eddy current EI is generated which spins around the magnetic field B inside the bottom of the body 10. The body 10 is heated by the eddy current EI. Specifically, if the eddy current EI flows through the body 10 with an electrical resistance, the atomic nuclei of the body 10 collide with the electrons of the eddy current EI. The collisions between the atomic nuclei and the electrons generate heat. In other words, the smart table 1000 may supply current to the heating coil L, and the body 10 of the smart kettle 1 may be heated by the magnetic field B generated by the heating coil L.

At this time, the body 10 includes a magnetic body which is heated by the eddy current EI and a non-magnetic body which is not heated by the eddy current EI. Specifically, an outer surface 109 of the bottom of the body 10 is formed of a non-magnetic body and thus is not influenced by the magnetic field B, and an inner surface 102 of the bottom of the body 10 is formed of a magnetic body and may be heated by the magnetic field B.

Further, the inner surface 102 of the body 10 may be formed of a magnetic body integrally formed, and a side wall of the outer surface of the body 10 may be formed of a magnetic body integrally formed with the inner surface 102, and the bottom of the outer surface of the body 10 may be formed of a non-magnetic body.

In other words, in the smart kettle 1, the temperature sensor for measuring the temperature of the body 10 is attached to the bottom surface opposite to the space where the contents are contained in the body so that no connecting part is formed in the inner surface of the body. This may address the difficulty in washing the body 10 and prevent a buildup of undesired matter. Further, it is possible to remove the likelihood that the temperature sensor is broken upon cleaning the body 10 while enhancing the user's convenience and facilitating the maintenance of the body.

The side wall of the body 10 may include a vacuum space 105 that prevents the heated contents from easily cooling down, thus keeping the contents warm. Thus, the smart kettle 1 may lead to increased energy efficiency and maintain the temperature of the heated contents.

Referring to FIG. 5, the support 20 of the smart kettle 1 may include a power receiving coil 210 and a temperature sensor 215.

The power receiving coil 210 may receive wireless power through the magnetic field B generated from the smart table 1000. For example, the power receiving coil 210 may receive or produce wireless power from the smart table 1000 by an electromagnetic induction scheme and magnetic resonance scheme.

The power receiving coil 210 may be disposed inside the support 20 and be formed along the outer circumferential surface of the bottom of the support 20. For example, the power receiving coil 210 may be disposed in the shape of a doughnut.

The temperature sensor 215 may be disposed in the center of the support 20 and contact the outside of the bottom of the body 10. In other words, as the support 20 is coupled to the bottom of the body 10, the temperature sensor 215 may contact the bottom of the body 10 to measure the temperature of the bottom of the body 10.

For example, the temperature sensor 215 may be disposed to contact the non-magnetic body portion of the bottom of the body 10 to measure the temperature of the body 10. At this time, since a vacuum space is formed between the magnetic body and non-magnetic body of the body 10 containing the contents, the temperature sensor 215 may not directly measure the temperature of the contents. In some implementations, the temperature measured by the temperature sensor 215 may be compensated for by pre-stored data, thereby allowing the temperature of the contents in the body 10 to be measured in a precise manner.

In some implementations, the temperature sensor 215 may be located in a place other than the center of the support 20.

Figure 6:
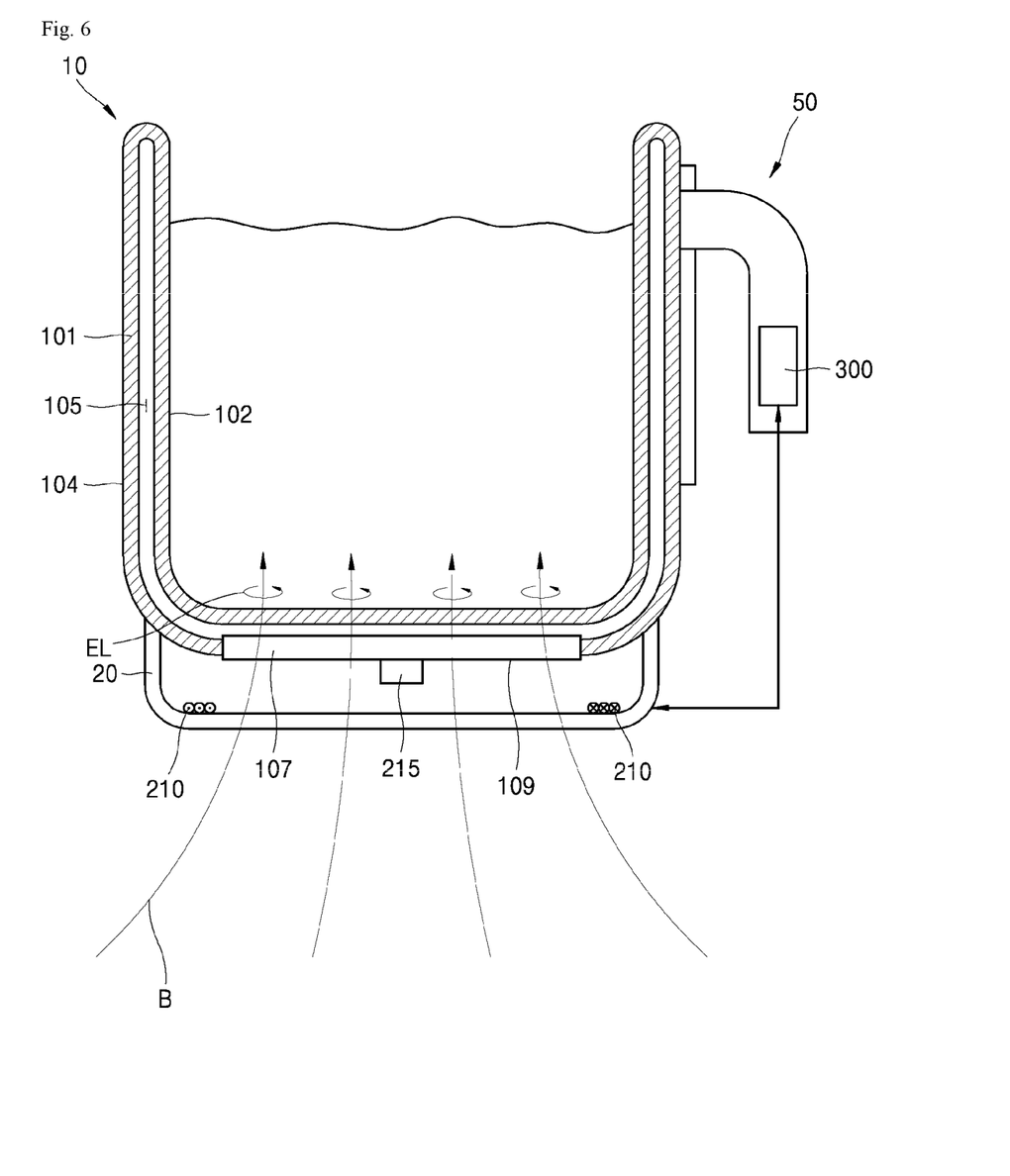
FIG. 6 illustrates an example smart kettle.
Figure 7:
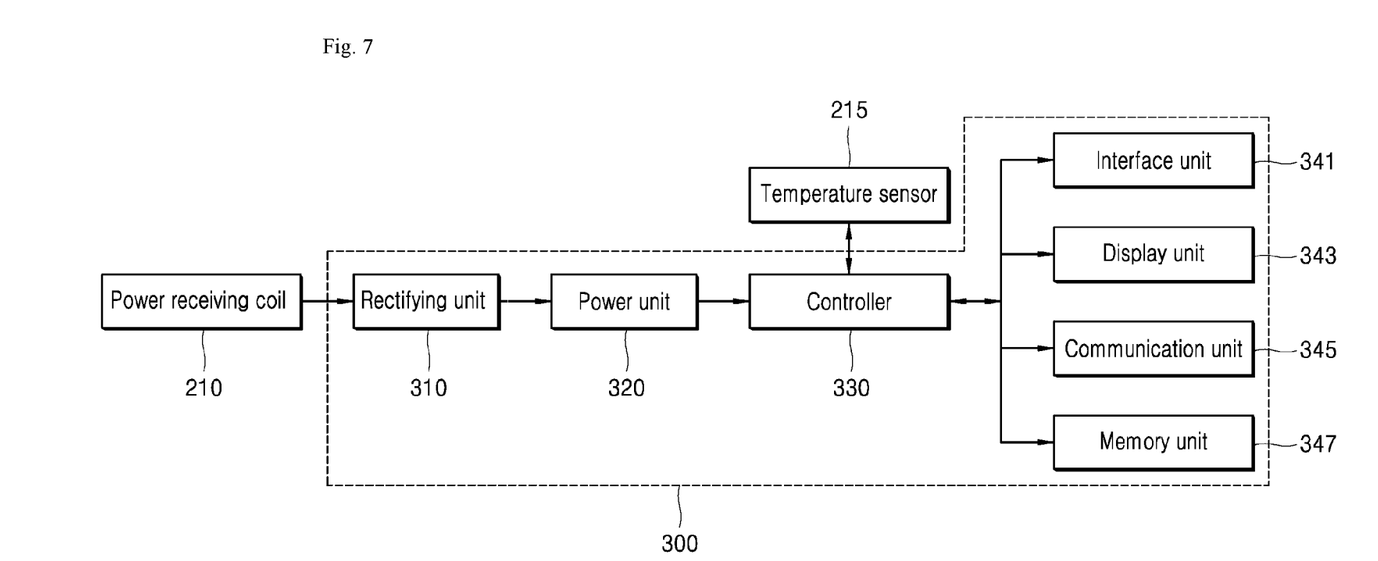
FIG. 7 is a block diagram of an example method of operating a smart kettle.

FIG. 6 is a view illustrating an example smart kettle. FIG. 7 is a block diagram illustrating a method of operating an example smart kettle.

Referring to FIGS. 6 and 7, power produced by the power receiving coil 210 may be used to operate each component of the smart kettle 1.

The power receiving coil 210 may wirelessly, or through wires, transfer the produced power to a control circuit 300 that controls the operation of the smart kettle 1.

The control circuit 300 that controls the operation of the smart kettle 1 includes a rectifier 310, a power unit 320, a controller 330, an interface unit 341, a display unit 343, a communication unit 345, and a memory unit 347.

Specifically, the power receiving coil 210 produces AC power using a magnetic field applied. The generated AC power is transferred to the rectifier 310.

The rectifier 310 rectifies the AC power produced by the power receiving coil 210 into DC power. The rectifier 310 may reduce variations in the generated DC power and keep the DC power uniform or even. In other words, the rectifier 310 may include a rectifying circuit RC to convert AC power into DC power and a smoothing circuit SC to keep the DC power uniform. For example, the rectifying circuit RC may be in a full bridge-type with four diodes, and the smoothing circuit SC may be in the form of capacitors being connected in parallel to two terminals.

The power unit 320 may transfer the DC power received from the rectifying unit 310 to the controller 330. At this time, the power unit 320 may include an energy storage system (ESS) for managing the produced power, thereby providing power to the controller 330 stably.

The controller 330 may control the overall operation of the smart kettle 1.

The controller 330 may transfer a control signal to each component so that the smart kettle 1 is operated by a user command received through the interface unit 341. In other words, the controller 330 functions to control the signal flow between the internal components of the smart kettle 1 and the overall operation and to process data.

The user command received through the interface unit 341, the operation state of the smart kettle 1, and the temperature of the inside of the body 10 may be displayed on the display unit 343. The display unit 343 may display the pieces of information using colors or numbers.

The controller 330 controls to transfer the power supplied from the power unit 320 to the internal components of the induction heating cooker. The controller 330 may generate a control signal for adjusting the magnitude of the magnetic field B produced from the smart table 1000 based on a difference between the temperature measured by the temperature sensor 215 and the target temperature received from the user through the interface unit 341.

The communication unit 345 may wirelessly transfer the generated control signal to the smart table 1000. At this time, short-range wireless communication networks available to the communication unit 345 may include Bluetooth, radio frequency identification (RFID), infrared data association (IrDA), ultra-wide band (UWB), Zigbee, and Z-wave.

The memory unit 347 may store, e.g., the operation input by the user or the target temperature set by the user and may provide the stored data to the controller 330. The memory unit 347 may include one or more volatile memory devices, such as double data rate static DRAM (DDR SDRAM) and single data rate SDRAM (SDR SDRAM) and/or one or more non-volatile memory devices, such as electrical erasable programmable ROM (EEPROM) and flash memory.

The smart kettle 1 may include an IH heating-enabled magnetic body in the bottom of the body 10 and may adjust the magnitude of the magnetic field applied to the body 10 depending on the temperature measured by the temperature sensor 215. At this time, the smart kettle 1 may receive a target temperature from the user and be controlled to maintain the target temperature so that a high-power magnetic field may be generated to heat the contents up to the target temperature, thereby shortening the heating time for the contents. Further, the smart kettle 1 may be controlled to prevent its temperature from rising over the target temperature, thereby contributing to the user's safety.

FIGS. 8-12 are views of example bodies of example smart kettles.

For ease of description, no description is given for what overlaps those described above in connection with the foregoing implementations, and the following description focuses primarily on the differences.

Figure 8:
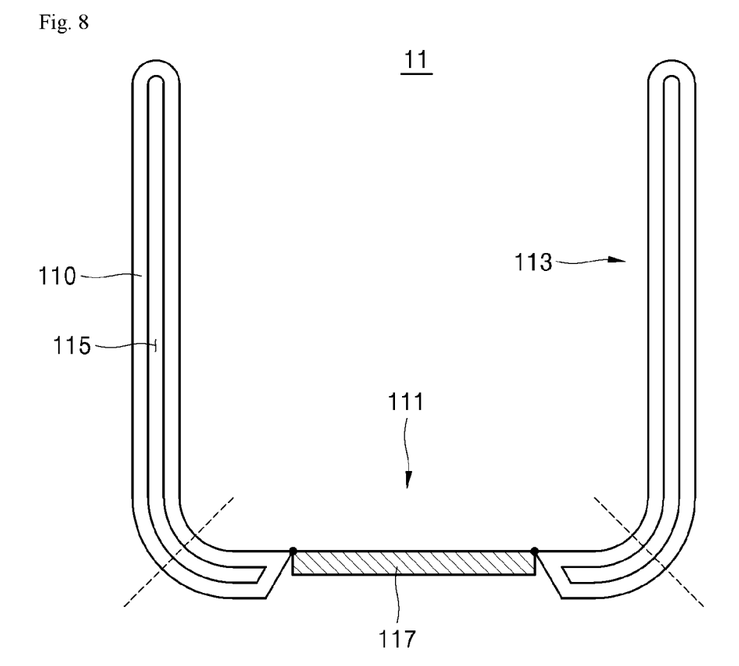
FIGS. 8-12 illustrate bodies of example smart kettles.

Referring to FIG. 8, the body 11 of the smart kettle includes a first portion 111 which forms the bottom of the body 11 and a second portion 113 which connects to the bottom and forms the side wall of the body 11. In this case, the second portion 113 may include a vacuum space 115 thereinside.

The first portion 111 may include a magnetic body 117 formed in the center and a non-magnetic body 110 formed at the outside.

The magnetic body 117 is disposed in a circle in the center of the bottom, and the non-magnetic body 110 may be formed to contact the outer circumference of the magnetic body 117. The non-magnetic body 110 may be integrally formed with the second portion 113 forming the side wall of the body 11. A vacuum space 115 may be formed inside the non-magnetic body 110. Thus, the magnetic field B produced in the smart table 1000 may be dense primarily in the portion where the magnetic body 117 is formed.

In this case, the magnetic body 117 may include a SUS 4XX-series material, and the non-magnetic body 110 may include a SUS 3XX-series material.

Figure 9:
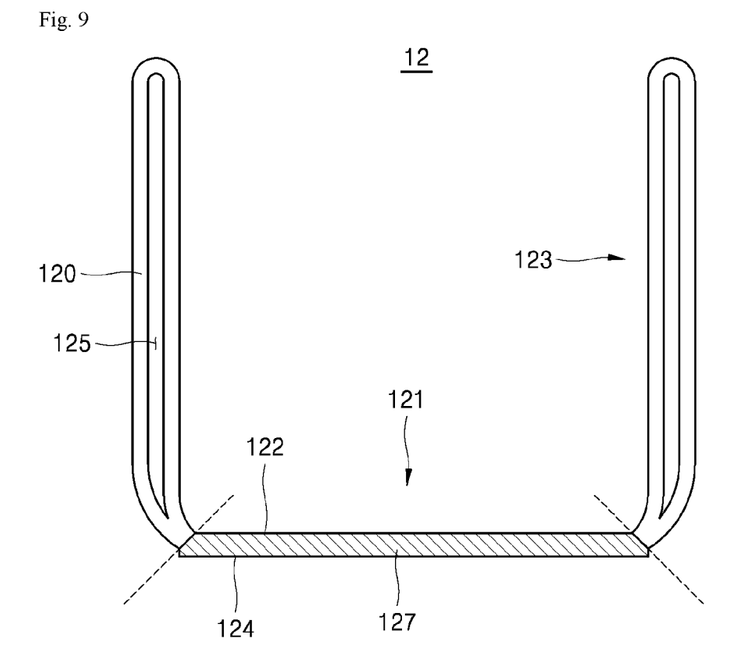

Referring to FIG. 9, the body 12 of the smart kettle includes a first portion 121 which forms the bottom and a second portion 123 which connects to the bottom and forms the side wall of the body 12.

In this case, the first portion 121 may include the magnetic body 127 alone, the second portion 123 may include the non-magnetic body 120 alone, and the non-magnetic body 120 may include a vacuum space 125 thereinside.

Thus, the magnetic body 127 may form the inner and outer surfaces of the bottom, and the non-magnetic body 120 may contact the outer circumference of the magnetic body 127 to form a side wall.

The body 12 of the smart kettle includes a broader magnetic body than the body 11 of the smart kettle, so that the sensitivity to the magnetic field B may increase.

In this case, the magnetic body 127 may include a SUS 4XX-series material, and the non-magnetic body 120 may include a SUS 3XX-series material.

Figure 10:
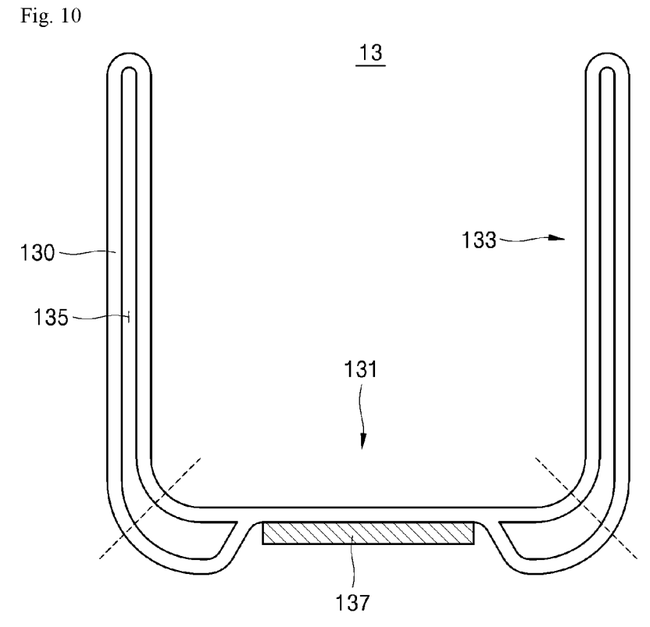

Referring to FIG. 10, the body 13 of the smart kettle includes a first portion 131 which forms the bottom and a second portion 133 which connects to the bottom and forms the side wall of the body 13.

In this case, the first portion 131 includes a non-magnetic body 130 that forms the inner surface of the bottom and is not heated by the magnetic field B and a magnetic body 137 that forms the outer surface of the bottom and is heated by the magnetic field B. The second portion 133 may include the non-magnetic body 130 alone, and the non-magnetic body 130 may include a vacuum space 135 thereinside.

The non-magnetic body 130 may form the inner surface of the body 13 and be processed to form no connecting part inside, and the magnetic body 137 may be disposed in the first portion 131 of the body 13 to contact one surface of the non-magnetic body 130.

In this case, the vacuum space 135 may be formed in the outside of the first portion 131 but not in the center of the first portion 131.

In this case, the magnetic body 137 may include a SUS 4XX-series material, and the non-magnetic body 130 may include a SUS 3XX-series material.

Figure 11:
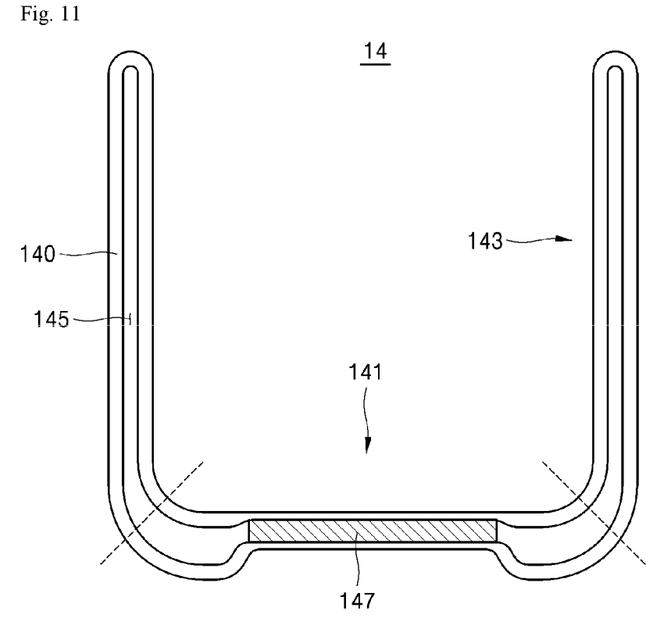

Referring to FIG. 11, the body 14 of the smart kettle includes a first portion 141 which forms the bottom and a second portion 143 which connects to the bottom and forms the side wall of the body 14.

In this case, the first portion 141 includes a non-magnetic body 140 that forms the inner surface and outer surface of the bottom and is not heated by the magnetic field B and a magnetic body 147 that is disposed inside the non-magnetic body 140 and is heated by the magnetic field B. The second portion 143 may include the non-magnetic body 140 alone, and the non-magnetic body 140 may include a vacuum space 145 thereinside.

The non-magnetic body 140 may form the inner surface of the body 14 and be processed to form no connecting part inside, and the magnetic body 147 may be disposed inside the non-magnetic body 140 corresponding to the first portion 141 of the body 14. Thus, in the non-magnetic body 140, the inner and outer surfaces of the body 14 are integrally formed with each other, and the magnetic body 147 may be disposed inside the non-magnetic body 140 to be heated by the magnetic field B passing through the non-magnetic body 140.

In this case, the magnetic body 147 may include a SUS 4XX-series material, and the non-magnetic body 140 may include a SUS 3XX-series material.

Figure 12:
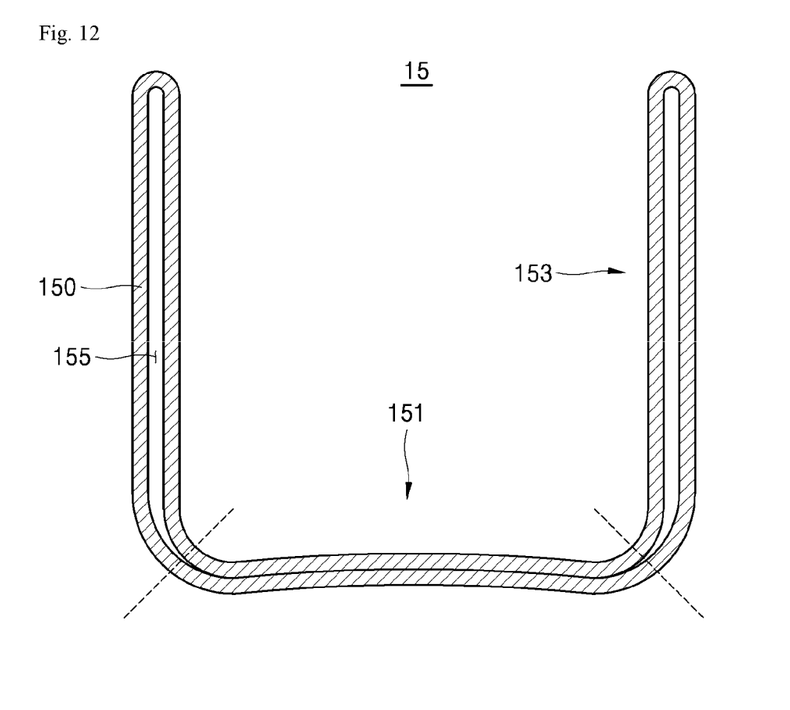

Referring to FIG. 12, the body 15 of the smart kettle includes a first portion 151 which forms the bottom and a second portion 153 which connects to the bottom and forms the side wall of the body 15.

In this case, the first portion 141 and the second portion 153 each include a magnetic body 150 which is heated by the magnetic field B. In the magnetic body 150, the inner and outer surfaces of the body 14 may be integrally formed with each other and be formed of a single material. The vacuum space 155 may be formed only in the second portion 153.

In this case, the magnetic body 150 may include a SUS 4XX-series material.

The body 11 to 15 of the smart kettle described above in connection with FIGS. 8 to 12 may replace the body 10 described above in connection with FIGS. 1 to 7. Thus, no detailed description of the duplicated components is given below.

In some implementations, the smart kettle may include an IH heating-enabled magnetic body in the bottom of the body 10 to 15 and may adjust the magnitude of the magnetic field applied to the smart kettle from the smart table 1000 based on the temperature measured by the temperature sensor.

At this time, the smart kettle may receive a target temperature from the user and be controlled to maintain the target temperature so that a high-power magnetic field may be generated to heat the contents up to the target temperature, thereby shortening the heating time for the contents. Further, the smart kettle 1 may be controlled to prevent its temperature from rising over the target temperature, thereby contributing to the user's safety.

The invention claimed is:

1. A smart kettle, comprising:
   a body that is configured to increase in temperature in response to a magnetic field;
   a temperature sensor that is located on a bottom of the body and that is configured to measure a temperature of the bottom of the body; and
   a controller that is configured to output a control signal to adjust a strength of the magnetic field based on the temperature measured by the temperature sensor,
   wherein the controller is configured to output the control signal to adjust the strength of the magnetic field by:
      compensating the measured temperature by using pre-stored data to correct a temperature measurement error resulting from a vacuum space between an inner surface of the bottom of the body and an outer surface of the bottom of the body, and
      adjusting the strength of the magnetic field based on the compensated temperature.

2. The smart kettle of claim 1, comprising:
   a power receiving coil that is located on the bottom of the body and that is configured to generate alternating current (AC) power in response to the magnetic field;
   a rectifier that is configured to convert the AC power received from the power receiving coil into direct current (DC) power; and
   a power supply configured to provide the DC power received from the rectifier to the controller.

3. The smart kettle of claim 2, comprising:
   a support that includes the power receiving coil and the temperature sensor and that is coupled to the bottom of the body,
   wherein the power receiving coil is located on a bottom of the support.

4. The smart kettle of claim 3, wherein the temperature sensor is located in a center of the support and is configured to measure the temperature of the bottom of the body by contacting the outer surface outside of the bottom of the body.

5. The smart kettle of claim 2, comprising:
   a communicator configured to transmit the control signal to a smart table that is configured to generate the magnetic field.

6. The smart kettle of claim 5, comprising:
   an interface configured to, based on an input being received from a user, determine a target temperature; and
   a display configured to display the target temperature on a screen using a color or a number,
   wherein the controller is configured to adjust the temperature measured by the temperature sensor to the target temperature by adjusting, based on the control signal, the magnetic field generated by the smart table.

7. The smart kettle of claim 1, comprising:
a magnetic body that is integrated with the inner surface and that is configured to increase in temperature in response to the magnetic field; and
a non-magnetic body that is located on a portion of a bottom of the outer surface of the body and that is configured not to react to the magnetic field.

8. A smart kettle used over a smart table configured to generate a magnetic field, the smart kettle comprising:
a body that is configured to increase in temperature in response to the magnetic field generated by the smart table; and
a controller that is configured to output a control signal to adjust a strength of the magnetic field based on the temperature of the body,
wherein the controller is configured to output the control signal to adjust the strength of the magnetic field by:
compensating a temperature measured in the body by using pre-stored data to correct a temperature measurement error resulting from a vacuum space between an inner surface of a bottom of the body and an outer surface of a bottom of the body, and
adjusting the strength of the magnetic field based on the temperature measured in the body.

9. The smart kettle of claim 8, wherein the body includes:
a first portion that defines the bottom of the body, and
a second portion that defines a side wall of the body that is connected with the bottom of the body and that defines the vacuum space inside the second portion.

10. The smart kettle of claim 9, wherein the first portion includes:
a magnetic body that is located in a center of the first portion and that is configured to increase in temperature in response to the magnetic field; and
a non-magnetic body that contacts the magnetic body at an outer surface of the first portion and that is configured not to react to the magnetic field.

11. The smart kettle of claim 9, wherein the first portion includes a magnetic body that defines an inner surface and an outer surface of the bottom of the body and that is configured to increase in temperature in response to the magnetic field.

12. The smart kettle of claim 9, wherein the first portion includes a non-magnetic body that defines an inner surface of the bottom of the body and that is configured not to react to the magnetic field and a magnetic body that defines an outer surface of the bottom of the body and that is configured to increase in temperature in response to the magnetic field.

13. The smart kettle of claim 9, wherein the first portion includes a non-magnetic body that defines an inner surface and an outer surface of the bottom of the body and that is configured not to react to the magnetic field and a magnetic body that is located inside the non-magnetic body and that is configured to increase in temperature in response to the magnetic field.

14. The smart kettle of claim 9, wherein the first portion and the second portion (i) include a magnetic body that is configured to increase in temperature in response to the magnetic field and (ii) are integrally formed with each other.

15. The smart kettle of claim 9, wherein the first portion does not define the vacuum space.

16. The smart kettle of claim 8, comprising:
a temperature sensor that is located on a bottom of the body and that is configured to measure a temperature of the bottom of the body;
a power receiving coil that is located on the bottom of the body and that is configured to generate electricity in response to the magnetic field;
a power supply configured to provide electricity received from the power receiving coil to the controller; and
a communicator configured to wirelessly transmit the control signal to the smart table.

17. The smart kettle of claim 16, wherein:
the temperature sensor is located in a center of an outside of the bottom of the body and is configured to measure the temperature of the body, and
the controller is configured to adjust, by generating the control signal, the strength of the magnetic field generated by the smart table based on the temperature measured by the temperature sensor.

18. The smart kettle of claim 16, comprising:
an interface configured to determine a target temperature based on receiving an input from a user; and
a display configured to display the target temperature on a screen using a color or a number,
wherein the controller is configured to adjust the temperature measured by the temperature sensor to the target temperature by adjusting, using the control signal, the magnetic field generated by the smart table.

* * * * *